J. BOWING.
FILTER-PRESSES.
No. 194,124. Patented Aug. 14, 1877.
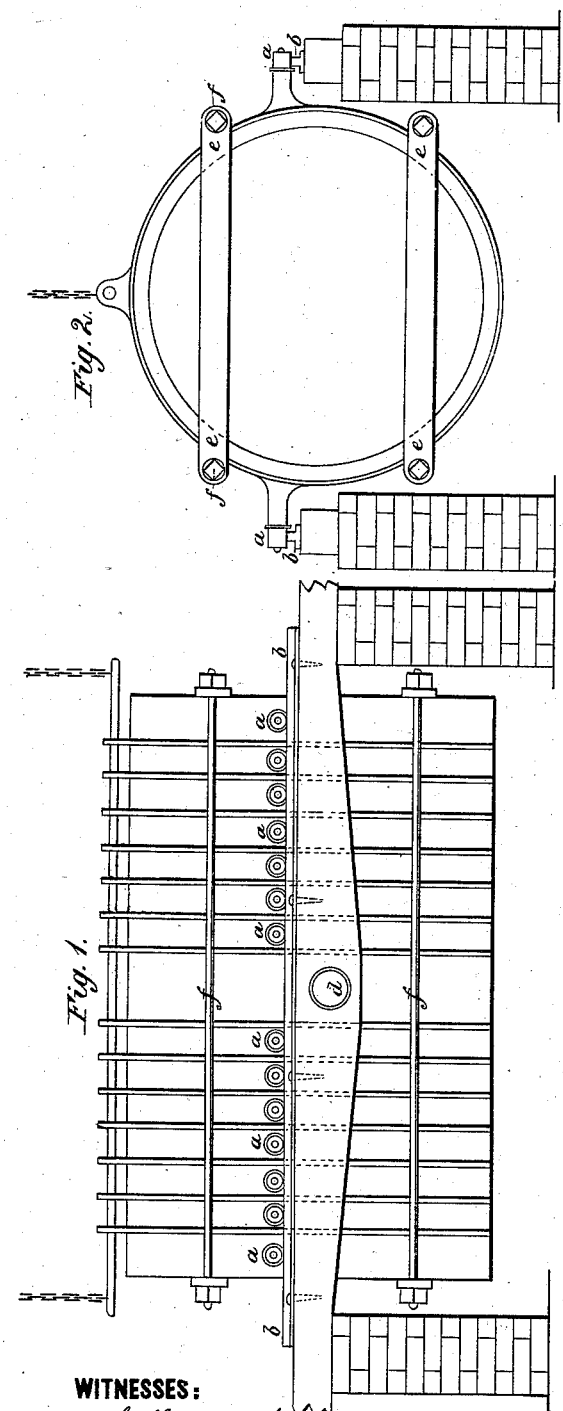
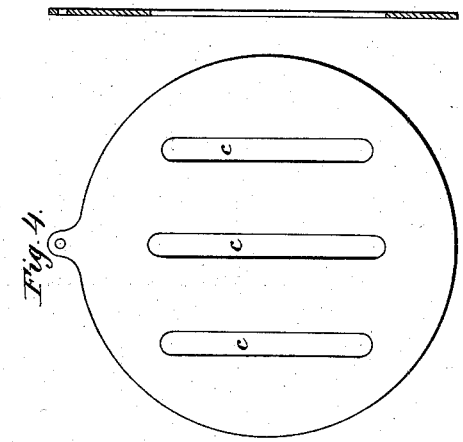
WITNESSES:
W. W. Hollingsworth
Solon C. Kemon
INVENTOR:
John Bowing
BY
Munn & Co
ATTORNEYS.

UNITED STATES PATENT OFFICE.

JOHN BOWING, OF CORNHILL, LONDON, ENGLAND.

IMPROVEMENT IN FILTER-PRESSES.

Specification forming part of Letters Patent No. 194,124, dated August 14, 1877; application filed May 14, 1877.

*To all whom it may concern:*

Be it known that I, JOHN BOWING, of No. 2 Saint Michael's House, Saint Michael's Alley, Cornhill, in the city of London, England, manufacturing chemist, have invented new and useful Improvements in Filter-Presses, which improvements are fully set forth in the following specification, reference being had to the accompanying drawings.

I construct my improved filtering apparatus in the following manner: I form a compound filtering-chamber or a series of chambers by connecting a series of rings, Figure 3, made of wood or other suitable material, which are bound together with iron hoops. The rings thus made are mounted on rollers $a$, which run on two suspended rails, $b\ b$, so as to admit of their being easily moved, and when in contact the rings form a horizontal cylinder. The dimensions of these rings are determined by the amount and by the physical character of the matter to be operated upon in the filter. Between each two rings I suspend or otherwise place a plate or disk, Fig. 4, preferably of sheet metal, not less in diameter than the outer diameter of the rings. Each disk has one or more large holes or slits, $c$, cut in it, so that any dense fluid matter can flow readily from one side of the disk to the other, or from one of the series of chambers to the other. That part of the disk which coincides with the faces of its two adjoining rings is left entire, the length of the slits or holes being less than the diameter of the ring. The disks are partly covered on both sides with canvas, cloth, linen, sacking, calico, felt, matting, or such like material, the holes or slits being left uncovered. The material employed as covering need not entirely cover the center parts of the disk, but it must be continuous round the outer edges of the disks, so as to form a circumferential edge all round between the two adjoining faces of the rings. The disks or plates so made and fitted, in fact, serve as partial diaphragms between each couple of contiguous chambers. In the central or one of the rings I make an inlet-hole, $d$, Fig. 1, through which the fluid mixture enters, and is forced into the apparatus when at work. At the two ends of the series of rings are two strong solid circles or plates, $e$, Fig. 2, fitted to receive the ends of the tie rods or bolts $f\,f$, by which the whole series is firmly secured or clamped together.

The process of working this apparatus is conducted as follows: The rings, with the disks or diaphragms, are moved along the rails, and fastened together by means of the bolts or tie-rods, so as to form the compound filtering-chamber. The apparatus is now a closed cylinder. Through the inlet $d$ in the circumference of the central ring the fluid mixture enters or is forced by the ordinary pumping apparatus until, by its readily passing through each successive diaphragm, the cylinder is filled. More of the fluid mixture is now forced in through the same inlet, and thereupon the water or other fluid, together with the matter held in it in solution, begins to pass or travel from every part of the inclosed mass along the diaphragms outward toward their circumferences, thence out between the edges of the contiguous rings through the outer edges of the covering material above mentioned, and thus finally escapes at the outside of the cylinder. This is continued until the matters held in suspension are separated and left as a residuum mass in the chambers sufficiently dry. The bolts are then removed, the apparatus is opened out by the rings being separated, and the solid slabs of pressed matter are caused to fall out beneath into some convenient receptacle. The total bulk of solid matter thus recovered at each operation is not much less than the entire internal capacity of the compound filter, as the disks or diaphragms may be made so thin as to be immaterial.

This form of filter-press is specially adapted to the treatment of very large masses or volumes of matter having low comparative value, such as waters, sewage, cement, slurry, potters' clay, china-clay, whiting, yeast, and the like. In the treatment of less bulks, or of delicate and costly bodies, such as chemicals, colors, wines, beers, sugars, and the like, the apparatus may be made of glass, porcelain, or other suitable material, and mounted in any other convenient manner.

Having now described the nature of my invention, and the manner in which the same is to be performed, I wish it to be understood that I do not limit myself to the precise details hereinbefore described, as the same may be varied without departing from the nature or principle of my said invention.

What I claim as my invention is—

The improvements in the construction of filter-presses, substantially as herein described, and as illustrated.

London, 12th March, 1877.

JNO. BOWING.

Witnesses:
 JNO. ANDRUS,
32 *Essex St., Strand, Solicitor.*
 T. CHARLES CHEESMAN,
*Clerk to Messrs. Gibson, Nichols & Nichols,
 Notaries, 54 Old Broad Street, London.*